United States Patent [19]

Abe et al.

[11] Patent Number: 5,162,447

[45] Date of Patent: Nov. 10, 1992

[54] PROCESS FOR MAKING A THERMOPLASTIC RESIN COMPOSITION

[75] Inventors: Hiroomi Abe; Taichi Nishio; Yasurou Suzuki; Takashi Sanada, all of Chiba, Japan

[73] Assignee: Sumitomo Chemical Co., Ltd., Osaka, Japan

[21] Appl. No.: 564,515

[22] Filed: Feb. 13, 1991

Related U.S. Application Data

[62] Division of Ser. No. 243,715, Sep. 13, 1988, Pat. No. 5,017,652.

[30] Foreign Application Priority Data

Sep. 18, 1987 [JP] Japan .................. 62-235453

[51] Int. Cl.$^5$ .................................. C09L 71/12
[52] U.S. Cl. .................................. 525/390; 525/391; 525/392; 525/396; 525/397; 525/905
[58] Field of Search ............... 525/397, 391, 392, 396, 525/930

[56] References Cited

U.S. PATENT DOCUMENTS 4,315,086  2/1982  Ueno et al. .

FOREIGN PATENT DOCUMENTS

| 164767 | 5/1984 | European Pat. Off. . |
| 182163 | 11/1984 | European Pat. Off. . |
| 0244090 | 11/1987 | European Pat. Off. . |
| 56-49753 | 5/1981 | Japan . |
| 59-66452 | 4/1984 | Japan . |
| 5659724 | 4/1984 | Japan . |
| 61296061 | of 1985 | Japan . |
| 61-204261 | 9/1986 | Japan . |
| 61-120855 | of 1987 | Japan . |
| 62-81449 | 4/1987 | Japan . |

*Primary Examiner*—Jacob Ziegler
*Attorney, Agent, or Firm*—Cushman, Darby & Cushman

[57] ABSTRACT

A process for making a thermoplastic resin composition which comprises a melting and mixing 100 parts by weight of polyphenylene ether (A) and 0.01-5.0 parts by weight of at least one compound (B) which contains in its molecule both (a) carbon-carbon double bond or carbon-carbon triple bond and (b) carboxyl group, acid anhydride group, acid amide group, imide group, carboxylic acid ester group, epoxy group, amino group or hydroxyl group in the presence of 0.01% or more and less than 0.1% by weight of radical initiator based on the polyphenylene ether (A), said polyphenylene ether (A) being obtained by oxidation-polymerization of at least one phenol compound represented by the formula:

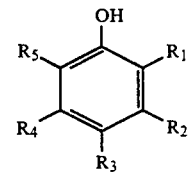

wherein $R_1$, $R_2$, $R_3$, $R_4$ and $R_5$ represent a hydrogen atom, a halogen atom, a hydrocarbon or a substituted hydrocarbon group, with a proviso that at least one of them is a hydrogen atom, and said polyphenylene ether (a) having a reduced viscosity $\eta_{sp/c}$ of 0.40-0.58 deciliter/gram.

1 Claim, No Drawings

PROCESS FOR MAKING A THERMOPLASTIC RESIN COMPOSITION

This is a division of application Ser. No. 07/243,715, filed Sep. 13, 1988. now U.S. Pat. No. 5,017,652.

This invention relates to a process for making a novel thermoplastic resin composition which can be made into shaped articles, sheets, films, etc. by injection molding, extrusion molding, etc.

More particularly, it relates to a process for making a novel thermoplastic resin composition which comprises polyphenylene ether and polyamide, which is excellent in heat resistance, mechanical properties, processability, solvent resistance, etc.

Polyphenylene ether is a thermoplastic resin superior in various properties such as mechanical properties, heat resistance, low-temperature resistance and dimension stability. However, polyphenylene ether itself is inferior in impact resistance and solvent resistance, and is unsatisfactory in terms of processability due to its high melt viscosity.

Polyamide is a thermoplastic resin superior in mechanical properties, solvent resistance, processability, etc. However, polyamide is unsatisfactory in terms of impact resistance, heat resistance, etc. and inferior in dimension stability due to its high water absorption.

In order to offset one disadvantage by another advantage, blends of the two resins have been proposed.

Japanese Patent Publication (Kokoku) No. 60-11966, Japanese Patent Publication (Kokai) No. 56-47432 and Japanese Patent Publication (Kokai) No. 56-49753 disclose such blends. Each of blends is improved in some points, but still does not have enough impact resistance.

Japanese Patent Publication (Kokai) No. 61-120855 discloses a polyphenylene ether/polyamide composition which contains silane derivatives. However, the composition still does not have enough impact resistance.

Japanese Patent Publication (Kokai) No. 61-296061 suggests a polyphenylene ether/polyamide composition which contains oxidized polyethylene wax as the third component. The composition still does not have impact strength enough to be applied to a wide range of practical use.

Japanese Patent Publication (Kokai) No. 62-81449 discloses a composition which is resistant to both solvent and impact. However, the composition does not have a good balance between impact resistance and flexural modulus.

Japanese Patent Publication (Kokai) No. 61-204261 states that an impact-resistant resinous composition is obtained by blending a polyphenylene ether/polyamide composition with a copolymer consisting of a styrene compound and an $\alpha,\beta$-unsaturated dicarboxylic acid anhydride and a styrene elastomer. However, when this composition is molded, foaming often occurs, which is considered to be caused by degradation of dicarboxylic acid anhydride, and thereby appearance is deteriorated.

Japanese Patent Publication (Kokai) Nos. 59-59724 and 59-66452 disclose a process for making a polyphenylene ether having as part of its substituted groups carboxyl group and/or carboxylic acid anhydride structure wherein polyphenylene ether is reacted with 1,2-substituted olefin compounds having carboxyl group or acid anhydride structure in the presence of 0.1-5 parts by weight or 0.1 % by weight or more of a radical initiator, and also disclose a resin composition which comprises that polyphenylene ether and a polyamide. However, these process and composition have problems on foaming of shaped articles, gelation and heat stability which may result from the high amount of radical initiator used for modifying the polyphenylene ether.

It is an object of the present invention to provide a polyphenylene ether/polyamide composition which is excellent in impact resistance particularly at room temperature and low temperature, heat resistance and flexural modulus.

As a result of the inventor's wide-ranging and intensive researches and investigations on improvement of resin compositions comprising polyphenylene ether, polyamide and rubber-like materials, it has been found that a resin composition which has improved heat stability and gelation, has solved appearance problems caused by foaming and maintains impact and heat resistances of polyphenylene ether and polyamide, is obtained by melting and mixing polyphenylene ether with at least one compound containing in its molecule both (a) carbon-carbon double bond or carbon-carbon triple bond and (b) carboxyl group, acid anhydride group, acid amide group, imide group, carboxylic acid ester group, epoxy group, amino group or hydroxyl group in the presence of a specific amount of radical initiator.

Primarily, the present invention provides a process for making a modified polyphenylene ether which comprises melting and mixing 100 parts by weight of polyphenylene ether resin (A) with 0.01–5.0 parts by weight of at least one compound (B) containing in its molecule both (a) carbon-carbon double bond or carbon-carbon triple bond and (b) carboxyl group, acid anhydride group, acid amide group, imide group, carboxylic acid ester group, epoxy group, amino group or hydroxyl group in the presence of 0.01 % or more and less than 0.1 % of radical initiator by weight based on the polyphenylene ether resin (A).

Secondarily, the present invention provides a process for making a thermoplastic resin composition which comprises blending the above modified polyphenylene ether with rubber-like materials (C) and/or polyamide. The resin composition has improved heat stability, gelation and appearance problems caused by foaming.

It has been unexpected from the prior viewpoint that the use of 0.01 % or more and less than 0.1 % of radical initiator by weight based on polyphenylene ether upon the modification of polyphenylene ether with the compounds (B) can improve the problems of polyphenylene/polyamide compositions on heat stability, gelation and foaming.

Polyphenylene ether (A) used in the present invention is a polymer obtained by oxidation polymerization of one or more of phenol compounds having the formula:

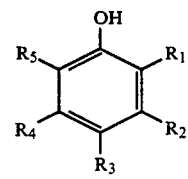

wherein $R_1$, $R_2$, $R_3$, $R_4$ and $R_5$ represent a hydrogen atom, a halogen atom, a hydrocarbon or a substituted hydrocarbon group and at least one of them is a hydrogen atom, with molecular oxygen or gas containing the same in the presence of an oxidation coupling catalyst.

Examples of $R_1$–$R_5$ of the above formula are a hydrogen atom, a chlorine atom, a bromine atom, a fluorine atom and an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, and an allyl-group.

Examples of the phenol compound as shown in the above formula are phenol, o-, m- or p-cresol, 2,6-, 2,5-, 2,4- or 3,5-dimethylphenol, 2-methyl-6phenylphenol, 2,6-diphenylphenol, 2,6-diethylphenol, 2-methyl-6-ethylphenol, 2,3,5-, 2,3,6- or 2,4,6-trimethylphenol, 3-methyl-6-t.-butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin. Preferable polymers are homopolymers of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxydation polymerization of the phenol compound, as long as it has polymerization ability. Examples are cuprous compound/tert. amine such as cuprous chloride/triethylamine and cuprous chloride/pyridine; cupric compound/amine/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether (A) further includes that grafted with styrenic polymer or other polymer. For instance, grafted one is obtained by graft-polymerizing styrene monomer and/or other polymerizable monomer in the presence of polyphenylene ether and organic peroxide (Japanese Patent Publications (Kokoku) 47-47862, 48-12197, 49-5623, 52-38596 and 52-30991) or by melt-kneading polyphenylene ether and polystyrene in the presence of a radical initiator (Japanese Patent Publication (Kokai) 52-142799).

Polyphenylene ether (A) has a reduced viscosity $\eta_{sp/c}$ of 0.40–0.58 deciliter/gram, more preferably 0.45–0.52 deciliter/gram, as measured at 25° C. in chloroform.

The polyamide used in the present invention may be those obtained by polycondensation of lactams of three or more membered rings, polymerizable ω-amino acids, dibasic acids with diamines, etc. As typical examples thereof, mention may be made of polymers of ε-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dodecamethylenediamine, m-xylylenediamine, etc. with dicarboxylic acids such as terephthalic acid, isophthalic acid, adipic acid, sebacic acid, dibasic dodecanoic acid, glutaric acid, etc., or copolymers thereof.

Typical examples of said polyamide are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

The radical initiator used in the present invention may be any known organic peroxide or diazo compound. Preferred examples of the radical initiator are benzoyl peroxide, dicumyl peroxide, di-tert-butyl peroxide, tert-butylperoxy laurate, tert-butyl cumyl peroxide, tert-butyl hydroperoxide, cumene hydroperoxide, azobisisobutyronitrile, 1,3-bis-(tert-butylperoxy isopropyl) benzene, etc.

In the present invention, addition amount of the radical initiator is 0.01 % or more and less than 0.1 % by weight based on the polyphenylene ether (A). If it is less than 0.01 % by weight, modification of polyphenylene ether with the compounds (B) is not effected sufficiently for example to improve impact resistance. If it is 0.1 % by weight or more, polyphenylene ether/polyamide compositions come to have problems on heat stability, gelation and appearance which results from foaming. The addition amount of the radical initiator is preferably 0.01 to 0.08 % by weight.

In the present invention, 5–95 % by weight of modified polyphenylene ether containing rubber-like 15 material (C) is blended with 95–5 % by weight of polyamide. If polyamide is less than 5 % by weight, solvent resistance and processability are not sufficiently improved. If polyamide is more than 95 % by weight, thermal properties such as heat distortion temperature are degraded.

Rubber-like materials (C) used in this invention mean natural and synthetic polymer materials which are elastic at room temperature. Preferable example is saturated olefin rubber, styrene-grafted copolymer rubber, styrenic block copolymer rubber or hydrogenated styrenic block copolymer rubber.

As examples of the rubber-like materials, mention may be made of natural rubber, butadiene polymer, butadiene-styrene copolymer (including all of random copolymers, block copolymers including SEBS (styrene-ethylene-butylene-styrene block copolymer) rubber, SBS (styrene-butadiene-styrene block copolymer) rubber, SI (Styrene-isoprene block copolymer) rubber, SEP (styrene-etylene-propylene block copolymer) rubber, etc. graft copolymers, etc.), isoprene polymer, chlorobutadiene polymer, butadiene-acrylonitrile copolymer, isobutylene polymer, isobutylene-butadiene copolymer, isobutylene-isoprene copolymer, acrylate ester copolymer, ethylene-propylene copolymer, ethylene-butene copolymer, ethylene-propylene-non-conjugated diene copolymer, Thiokol rubber, polysulfide rubber, polyurethane rubber, polyether rubber e.g., polypropylene oxide, epichlorohydrin rubber, polyester elastomer, polyamide elastomer, etc. These rubber-like materials may be used either alone or as a mixture of two or more of them.

These rubber-like materials may be produced by any methods (e.g., emulsion polymerization, solution polymerization, etc.) and with any catalysts (e.g., peroxides, trialkylaluminum, lithium halides, nickel catalysts).

Furthermore, there may also be used those which have various crosslinking degrees, various proportions of micro structures (e.g., cis structure, trans structure, vinyl group, etc.) or various average rubber particle sizes.

Various polymers such as random copolymers, block copolymers, graft copolymers, etc. may be used as the copolymers for rubber-like materials in this invention.

These rubber-like materials may be copolymers of the above-mentioned rubber-like materials and such monomers as other olefins, dienes, aromatic vinyl compounds, acrylic acid, acrylic acid ester and methacrylic acid ester. These copolymers may be prepared by any method, e.g. random copolymerization, block copolymerization, graft copolymerization, etc. Examples of these monomers are ethylene, propylene, styrene, chlorostyrene, α-methyl styrene, butadiene, isoprene, chlorobutadiene, butene, isobutylene, methylacrylate, acrylic acid, ethylacrylate, butylacrylate, methylmethacrylate, acrylonitrile, etc. The rubber-like material used in the present invention further includes those which are modified in part thereof, e.g., hydroxy or carboxy-terminal modified polybutadienes and partly hydrogenated styrene-butadiene block copolymers.

The rubber-like material of the present invention may be those which are modified by any methods of introduction of at least one of the compounds (B) described later. Generally, the methods are copolymerization including all of random copolymerization, block copolymerization, graft copolymerization etc., and reaction with main chain, side chain and terminal of molecule.

Preferably, the modified rubber-like material is an ethylene-propylene copolymer rubber and an ethylene-propylene-non-conjugated diene copolymer rubber (MAH-EPR) which are modified with maleic anhydride.

Addition amount of the rubber-like material (C) is preferably 1–40 parts by weight based on 100 parts by weight of the modified polyphenylene ether. If the rubber-like material (C) is 1 parts by weight or less, impact resistance is degraded. If the rubberlike material is more than 40 parts by weight, heat resistance is degraded.

Modification of the ethylene-propylene copolymer rubber or the ethylene-propylene-non-conjugated diene copolymer rubber is preferably effected by grafting the rubbers with 0.1–2.0 % by weight of maleic anhydride based on the rubbers.

The compound (B) of the present invention which contains in its molecule both (a) carbon-carbon double bond or carbon-carbon triple bond and (b) carboxyl group, acid anhydride group, acid amide group, imide group, carboxylic acid ester group, epoxy group, amino group or hydroxyl group, includes maleic anhydride, maleic acid, fumaric acid, maleimide, maleic acid hydrazide, a reaction product of maleic anhydride and diamine, e.g., compounds having the formulas

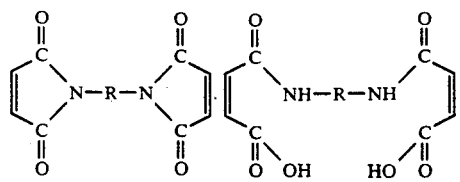

wherein R is an aliphatic or aromatic group, methylnadic anhydride, dichloromaleic anhydride, maleic acid amide and, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxided natural fats and oils such as epoxided soybean oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienic acid, octacosenoic acid, and tetraaconitic acid; and ester, acid amide or anhydride of unsaturated carboxylic acid above; and unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-5}OH$, $C_nH_{2n-7}OH$ or $C_nH_{2n-9}OH$ (n is an integer), 3-butene-1,2-diol, 2,5-dimethyl-3-hexene-2,5-diol, 1,5-hexadiene-3,4-diol and 2,6-octadiene-4,5-diol; and unsaturated amine such as that where an OH group of the unsaturated alcohol is replaced by an —NH₂ group; and polymers such as butadiene and isoprene of low molecular weight (e.g., 500–10000 of average molecular weight) and high molecular weight (e.g., 10000 or more of average molecular weight) to which maleic anhydride or phenolic acid is added or amino, carboxyl, hydroxyl or epoxy group is introduced.

It goes without saying that the compound (B) includes those having two or more of the functional groups of the (a) and two or more (which may be identical with or different from each other) of the functional groups of the (b). Further, the compound (B) may be a mixture of two or more selected from the compounds (B).

In the present invention, 0.01–5.0 parts by weight of the compound (B) is added to 100 parts by weight of the polyphenylene ether (A). If less than 0.01 part by weight of the compound (B) is added, no polyphenylene ether/polyamide composition in which impact and heat resistances are sufficiently improved, cannot be obtained. If more than 5.0 parts by weight, no significant effect is expected, and heat stability and appearance of shaped articles are deteriorated.

The polyphenylene ether/polyamide resin composition which is obtained by the present invention can be used not only as the above-mentioned blend but also in the form of composite materials reinforced with fibers such as glass fiber, carbon fiber, polyamide fiber and metallic whisker and composite materials to which are added inorganic fillers such as silica, alumina, calcium carbonate, talc, mica, carbon black, $TiO_2$, ZnO, and $Sb_2O_3$, flame retardants, lubricant nuclear agents, plasticizers, dyes, pigments, antistatic agents, antioxidants, weatherability providing agents, etc.

It should be noted that other features of the present invention reside in the step 1 wherein the rubber-like material is added at the time when polyphenylene ether is modified and the step 2 wherein the modified polyphenylene ether containing the rubberlike material which is obtained in the step 1 is mixed with polyamide resin.

These steps provide the resultant compositions with impact and heat resistances which are superior to those provided by the step wherein the polyphenylene ether (A), the compound (B), the radical initiator, the rubber-like material (C) and the polyamide resin are mixed together at the same time.

According to the present invention, the process for making resin compositions is conducted by use of melt-blending methods. Melt-blending is carried out in a single-screw or twin-screw extruder which is ordinarily used, various kneaders or so, preferably a twin-screw extruder.

Before melt-blending, it is preferable to uniformly blend powder or pellets of the component resins in a tumbler or a Henschel mixer. The blending above is not always necessary. Alternatively, each resin may be separately fed directly to a extruder through a metering apparatus.

Resin composition, after melt blending, is molded according to injection, extrusion and the like.

The resin composition obtained by this invention is used as shaped articles, sheets, tubes, films, fibers, laminates, coating materials, etc. made by injection molding or extrusion molding, especially as automobile parts such as bumper, instrument panel, fender, trim, door panel, wheel cover, side protector, garnish trunk-lid, bonnet, roof, etc., interior and exterior materials and mechanical parts required to have heat resistance.

Furthermore, the resin composition is used as parts for motor bicycles such as cowling material, muffler cover, leg shield, etc. and electrical and electronic parts such as housing, chassis, connector, base for printed circuit, pulley and other parts required to have strength and heat resistance.

This invention will be hereinafter further explained referring to examples below, wherein they are merely illustrative ones and this invention is not limited to them. Heat distortion temperature test (H.D.T.), Izod impact strength test (3.2 mm thick) and Melt Index (M.I.) are observed in accordance with JIS K7207, JIS K7110 and JIS K7210, respectively.

Heat stability was evaluated by observing changes of color (gelation or yellowing) after compositions are stood for 5 hours in a Geer's oven at 200° C.

Appearance was evaluated by observing whether or not foaming occurs.

Polyphenylene ether, polyamide and rubberlike materials used in the examples and comparative examples were as follows:

①  Polyphenylene ether

This was obtained in the following manner.

A solution is prepared by dissolving 2,6-dimethyl-phenol in toluene and methanol. The solution is oxidization-polymerized with the addition of manganese chloride/ethylene diamine under oxygen atmosphere at a reaction temperature of 30° C. to obtain polyphenylene ether.

② Polyamide

The following commercially available ones were used.

|  | Number average molecular weight | Content of end amine group (mmole/kg) |
|---|---|---|
| a) UNITIKA Nylon 6 A1030 BRL | 17500 | 60 |
| b) UNITIKA Nylon 6 A1025 BRL | 14000 | 71 |
| c) UBE Nylon 66 2020B which has 2.95 of relative viscosity measured in 98% sulfuric acid solution in accordance with JIS K6810-1970. | | |

③ Rubber-like materials a) MAH-EPR

This was obtained in the following manner.

Ethylene/propylene rubber (SUMITOMO ESPRENE® E120p) is preparatorily mixed with maleic anhydride and tert-butylperoxy laurate. The mixture is subjected to reaction in an extruder of 30 mm$\phi$ in screw diameter and L/D=28 at a barrel temperature of 230° C. and at a screw rotation of 60 rpm and modified rubber strand discharged from the die is cooled with water and then pelletized.

b) Ethylene/propylene rubber (EPR)

SUMITOMO ESPRENE® E120p manufactured by Sumitomo Chemical Co., Ltd.

c) Styrene/ethylene/butylene/styrene block copolymer (SEBS)

KRATON® G1657 having the ratio of styrene to rubber of 14/86 and manufactured by Shell Chemical Co.

EXAMPLE 1

Fifty parts by weight of polyphenylene ether having 0.48 deciliter/gram of reduced viscosity $\eta_{sp/c}$ as measured in chloroform at 25° C., 10 parts by weight of maleic anhydride grafted ethylene propylene rubber wherein 0.7 % by weight of maleic anhydride based on the rubber was grafted, 0.6 part by weight of maleic anhydride, and 0.05 % by weight of 1,3 bis(tert-butylperoxy isopropyl)benzene based on the polyphenylene ether, were charged to a continuous twin-screw extruder ("TEX-44®" manufactured by Nihon Seikou-sho) through a first hopper. Forty parts by weight of polyamide (UNITIKA Nylon 6 A1025 BRL) was also charged to the extruder through a second hopper located between the first hopper and the air vent by the use of a metering feeder. The mixture was melted and extruded at a cylinder temperature of 260° C. at screw rotation of 380 rpm.

The resulting composition was injection-molded by a injection molding machine IS-150E of Toshiba Co. to make test specimens for evaluating their properties, heat stability and appearance.

The test results are shown in Table 1.

COMPARATIVE EXAMPLE 1

Example 1 was repeated except that no radical initiator, i.e., 1,3 bis(tert-butylperoxy isopropyl)benzene was used.

COMPARATIVE EXAMPLE 2

Example 1 was repeated except that the same nylon as charged through the second hopper in Example 1, was charged through the first hopper together with the other materials.

COMPARATIVE EXAMPLE 3

Example 1 was repeated except that addition amount of the radical initiator was 0.15 % by weight based on the polyphenylene ether.

EXAMPLE 2

Example 1 was repeated except that 10 parts by weight of SEBS was used in place of the maleic anhydride grafted ethylene propylene rubber and that UNITIKA Nylon 6 A1030 BRL was used as polyamide.

EXAMPLE 3

Example 1 was repeated except that ethylene propylene rubber was used in place of the maleic anhydride grafted ethylene propylene rubber and that glycidyl methacrylate was used as the compound (B) in place of maleic anhydride.

It is understood from Examples 1-3 and Comparative Examples 1-3 that impact strength is degraded if no radical initiator is used, heat stability and appearance are degraded if more than 0.1 part by weight of radical initiator is used, and Izod impact strength is considerably lowered and appearance is degraded if all the materials are charged from the first feeder as indicated in Comparative Example 2.

EXAMPLE 4

Example 1 was repeated except that 45 parts by weight of polyphenylene ether, 15 parts by weight of maleic anhydride grafted ethylene propylene rubber and 40 parts by weight of UNITIKA Nylon 6 A-1030 BRL were used.

COMPARATIVE EXAMPLE 4

Example 1 was repeated except that 48 parts by weight of polyphenylene ether, 22 parts by weight of maleic anhydride grafted ethylene propylene rubber and 30 parts by weight of UNITIKA Nylon 6 A1030 BRL were used.

COMPARATIVE EXAMPLE 5

Example 1 was repeated except that addition amount of maleic anhydride was 6.0 parts by weight.

It is understood from Example 4 and Comparative Examples 4 and 5 that heat resistance (H.D.T.) and appearance are degraded if addition amount of maleic anhydride grafted ethylene propylene rubber is more than 40 parts by weight based on 100 parts by weight of modified polyphenylene ether, and heat stability and appearance are degraded if addition amount of maleic anhydride is more than 5 parts by weight based on 100 parts by weight of polyphenylene ether.

EXAMPLE 5

Example 1 was repeated except that 0.02 part by weight of the radical initiator and 40 parts by weight of UBE Nylon 66 2020B were used.

COMPARATIVE EXAMPLE 6

Example 5 was repeated except that addition amount of the radical initiator was 0.13 % by weight based on the polyphenylene ether.

COMPARATIVE EXAMPLE 7

Example 5 was repeated except that no radical initiator was used.

It is understood from Example 5 and Comparative Examples 6 and 7 that even when nylon 66 is used, heat stability and appearance are degraded if 0.1% by weight or more of radical initiator is used, and impact resistance is deteriorated if no radical initiator is used.

TABLE 1

| | Composition | | | | |
| --- | --- | --- | --- | --- | --- |
| | (The first feeder) | | | | (The second feeder) |
| | PPE | Rubber-like material | (B) | Radical initiator* | Nylon |
| Example 1 | Part by weight 50 | MAH-EPR Part by weight 10 | Maleic anhydride Part by weight 0.6 | wt % 0.05 | UNITIKA Nylon 6 A 1025BRL Part by weight 40 |
| Comparative Example 1 | Part by weight 50 | MAH-EPR Part by weight 10 | Maleic anhydride Part by weight 0.6 | — | UNITIKA Nylon 6 A 1025BRL Part by weight 40 |
| Comparative Example 2 | (The same components as in Example 1 were charged from the first feeder) | | | | |
| Comparative Example 3 | Part by weight 50 | MAH-EPR Part by weight 10 | Maleic anhydride Part by weight 0.6 | wt % 0.15 | UNITIKA Nylon 6 A 1025 BRL Part by weight 40 |
| Example 2 | Part by weight 50 | SEBS 10 | Maleic anhydride Part by weight 0.6 | wt % 0.05 | UNITIKA Nylon 6 A 1030 BRL Part by weight 40 |

TABLE 1-continued

| | | | | | |
|---|---|---|---|---|---|
| Example 3 | Part by weight 50 | EPR 10 | Glycidyl methacrylate Part by weight 0.6 | wt % 0.05 | UNITIKA Nylon 6 A 1025 BRL Part by weight 40 |
| Example 4 | Part by weight 45 | MAH-EPR Part by weight 15 | Maleic anhydride Part by weight 0.6 | wt % 0.05 | UNITIKA Nylon 6 A 1030 BRL Part by weight 40 |
| Comparative Example 4 | Part by weight 48 | MAH-EPR Part by weight 22 | Maleic anhydride Part by weight 0.6 | wt % 0.05 | UNITIKA Nylon 6 A 1030 BRL Part by weight 30 |
| Comparative Example 5 | Part by weight 50 | MAH-EPR Part by weight 10 | Maleic anhydride Part by weight 6.0 | wt % 0.05 | UNITIKA Nylon 6 A 1025 BRL Part by weight 40 |
| Example 5 | Part by weight 50 | MAH-EPR Part by weight 10 | Maleic anhydride Part by weight 0.6 | wt % 0.02 | UBE Nylon 66 2020B Part by weight 40 |
| Comparative Example 6 | Part by weight 50 | MAH-EPR Part by weight 10 | Maleic anhydride Part by weight 0.6 | wt % 0.13 | UBE Nylon 66 2020B Part by weight 40 |
| Comparative Example 7 | Part by weight 50 | MAH-EPR Part by weight 10 | Maleic anhydride Part by weight 0.6 | — | UBE Nylon 66 2020B Part by weight 40 |

| | MI 280° C./10 kg (g/10 min.) | Izod impact (kg cm/cm) | H.D.T. 18.6 kg/cm$^2$ (°C.) | Heat stability gelation yellowing | Appearance (foaming etc.) |
|---|---|---|---|---|---|
| Example 1 | 18 | 75 | 115 | Good | No foaming |
| Comparative Example 1 | 18 | 60 | 115 | Good | No foaming |
| Comparative Example 2 | 125 | 6.0 | 120 | Good | Foaming |
| Comparative Example 3 | 18 | 75 | 115 | No good | Foaming |
| Example 2 | 56 | 65 | 129 | Good | No foaming |
| Example 3 | 4 | 30 | 115 | Good | No foaming |
| Example 4 | 13 | 70 | 100 | Good | No foaming |
| Comparative Example 4 | 12 | 58 | 85 | Good | Foaming |
| Comparative Example 5 | 6 | 35 | 115 | No good | Foaming |
| Example 5 | 20 | 35 | 145 | Good | No foaming |
| Comparative Example 6 | 20 | 35 | 145 | No good | Foaming |
| Comparative Example 7 | 20 | 25 | 145 | Good | No foaming |

*wt. % based on PPE

According to the present invention, a process for making a thermoplastic resin composition is provided. The composition further provides a polyphenylene ether/polyamide resin composition excellent in heat stability and appearance as well as impact resistance and heat resistance.

We claim:

1. A process for making a thermoplastic resin composition which comprises melt-blending 100 parts by weight of polyphenylene ether (A) and 0.01–5.0 parts by weight of at least one compound (B) which contains in its molecule both (a) carbon-carbon double bond or carbon-carbon triple bond and (b) carboxyl group, acid anhydride group, acid amide group, imide group, carboxylic acid ester group, epoxy group, amino group alcoholic hydroxyl group or phenolic hydroxyl group in the presence of 0.01 % or more and less than 0.1 % by weight of radical initiator based on the polyphenylene ether (A), said polyphenylene ether (A) being obtained by oxidation-polymerization of at least one phenol compound represented by the formula:

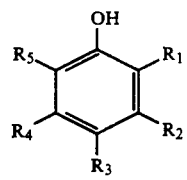

wherein $R_1$, $R_2$, $R_3$, $R_4$ and $R_5$ represent a hydrogen atom, a halogen atom, a hydrocarbon or a substituted hydrocarbon group, with a proviso that at least one of them is a hydrogen atom, and said polyphenylene ether (A) having a reduced viscosity $\eta_{sp/c}$ of 0.40–0.58 deciliter/gram.

* * * * *

UNITED STATES PATENT AND TRADEMARK OFFICE
CERTIFICATE OF CORRECTION

PATENT NO. : 5,162,447
DATED : November 10, 1992
INVENTOR(S) : ABE et al It is certified that error appears in the above-identified patent and that said Letters Patent is hereby corrected as shown below:

ON THE TITLE PAGE:

Please Change:

"[21] Appl. No. 564,515 to  -- [21] Appl. No. 654,515

Signed and Sealed this

Second Day of November, 1993

Attest:

BRUCE LEHMAN

*Attesting Officer*  *Commissioner of Patents and Trademarks*